Sept. 5, 1933.  W. J. CASSLEY ET AL  1,925,993

TIRE REPAIR VULCANIZER

Filed Feb. 13, 1931

INVENTORS
WILLIAM J. CASSLEY
JAMES W. BRUNDAGE

BY

ATTORNEYS

Patented Sept. 5, 1933

1,925,993

UNITED STATES PATENT OFFICE 1,925,993

TIRE REPAIR VULCANIZER

William J. Cassley and James W. Brundage, Akron, Ohio, assignors to The Summit Mold and Machine Company, Akron, Ohio, a corporation of Ohio Application February 13, 1931. Serial No. 515,558

2 Claims. (Cl. 18—18)

This invention relates to tire repair vulcanizers.

The general purpose of the invention is to provide an improved tire repair vulcanizer of that type which employs a jacketed base and relatively moving jacketed side walls, including improved means for supplying a fluid heating medium to a moving side wall.

Figure 1:
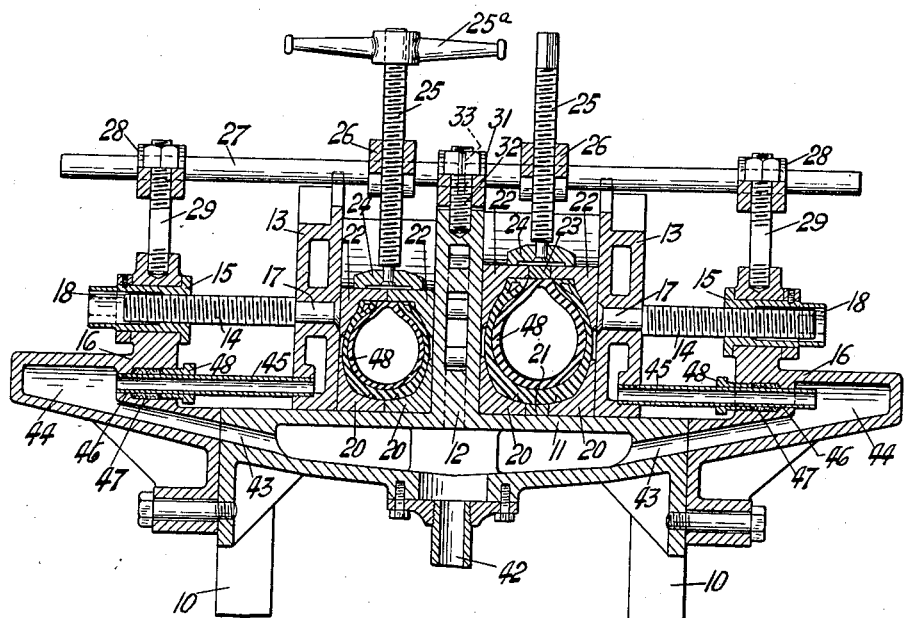
Figure 2:
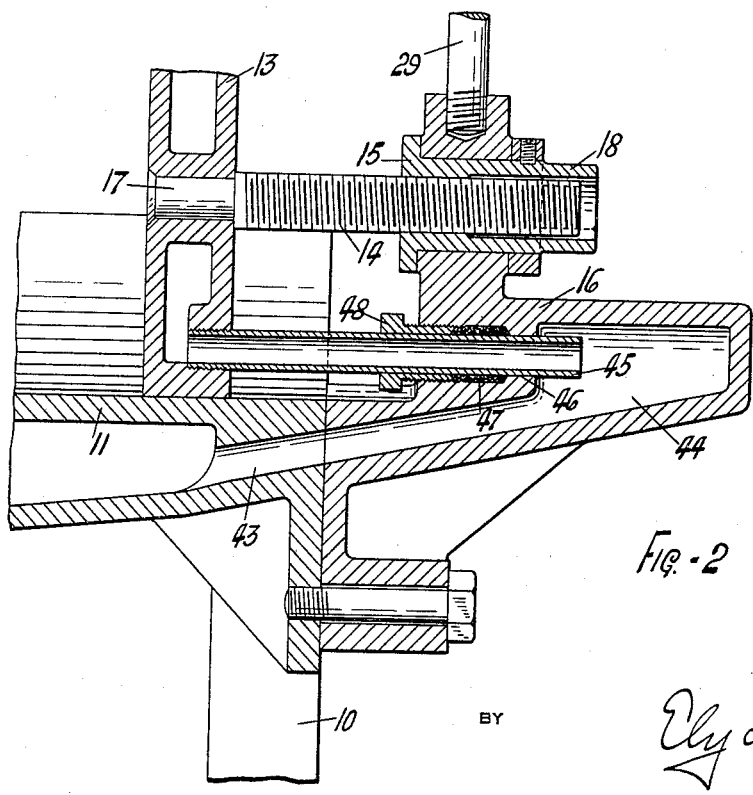

The foregoing and other purposes are attained in the repair vulcanizer illustrated in the accompanying drawing and described below. It is to be understood that the invention is not limited to the specific form thereof shown and described, Of the accompanying drawing, Figure 1 is a transverse section through a tire repair vulcanizer embodying the invention; and Figure 2 is an enlarged detail sectional view at the right end of Figure 1.

Referring to the drawing, the numeral 10 designates a suitable frame on which is supported an arcuate jacketed base 11 formed with a central jacketed wall 12. Two floating side wall members 13, also jacketed, are arranged to be moved over base 11 toward and from said central wall. The central wall and the two side walls are of arcuate formation as shown corresponding to the arcuate formation of the tires to be cured therein as to the major circumference of the tires, the sides of the side walls, however, preferably being flat.

To move the side wall members 13 toward and from the central wall member 12, screws 14, 14 may be provided, these being threaded through sleeves 15, 15 journaled in brackets 16, 16 mounted on frame 10, screws 14, 14 being journaled at 17, 17 in the side wall members 13. Sleeves 15 are preferably formed with polygonal ends 18, 18 extending outwardly of brackets 16 whereby a suitable wrench (not shown) may be applied over said ends of the sleeves for adjusting the side walls 13.

The molds include pairs of arcuate mating tread plates 20, 20 fitted between the central and side walls. These plates are all formed with an outer circumference fitted to the curvature of base 11 and with an inner circumference corresponding to a size or small range of sizes of the tires for which the tread plates are used, it being understood that a number of pairs of tread plates 20 having substantially the sectional contour of the tires to be cured are provided to accommodate the entire range of sizes to which the equipment is adapted. As will be apparent the tread plate equipment may be adapted for tires of the same major diameter but with varying minor diameters or tread widths by the provision of filler plates 21, these also having outer circumferences fitted to the curvature of base 11 and inner circumferences more or less fitted to the curvatures of tires to be cured.

The molds also include pairs of mating bead molding plates 22, 22 fitted to the contour of the bead portion of the tires, it being understood that a number of these pairs of plates will be used to accommodate a range of tire sizes. Filler plates 23 are employed with the bead molding plates also to adjust for various widths of tires of the same bead diameters.

The application of radial pressure to the molds is provided for by presser members 24 which may be adapted to be urged downwardly onto the bead molding plates 22 by screws 25 on the ends of which members 24 are journaled, the screws 25 being threaded through blocks 26 slidably adjustable along bars 27 which in turn are slidably mounted on supports 28. Supports 28 are secured on posts 29 on which they may be threaded as shown whereby they are vertically adjustable, a nut 30 being provided to secure each support 28 in place. The bars are removably supported at their inner ends on the central wall 12 by provision of a support 31 thereon similar to support 28, the support 31 being threaded onto a stud 32 secured on wall 12 so as to be adjustable vertically also. Support 31 is provided with apertures designed to receive both sets of bars 27, pins 33 being arranged across the central portions of these apertures to limit inward movement of the bars 27 therein. Screws 25 may be formed to be operated by a removable handle 25ᵃ.

The vulcanizer jackets 11, 12 and 13 are preferably heated by a fluid such as steam. A steam supply line 42 may be connected to base 11 and steam supplied to the base 11 is preferably distributed from base 10 to both the central and floating side walls. To conduct the heated fluid from the base 11 to the side walls, ducts 43, 43 may be provided in the ends of the base 11 and brackets 16 are formed with chambers as shown at 44, 44 to receive the heated fluid from base 11 through ducts 43. Pipes 45, 45 are connected to the jackets of walls 13 and are slidable through bores 46, 46 in brackets 16 so as to conduct the heating fluid to the floating walls in all positions of adjustment, suitable packing 47, 47 being provided in bores 46 about pipes 45 adapted to be compressed by glands 48, 48 to seal the sliding connection.

In use, the various molding parts are assembled in each mold as required to correspond to the tires to be vulcanized therein, the floating members 13 being adjusted away from the central wall 12, the bars 27 being slid back from over the molds and the pressure screws 25 being removed for this purpose. It will be apparent that these operations may be done with relation to one mold while not affecting continued vulcanization of a tire in the other mold. After the mold has been assembled about the tire and the enclosed sectional pressure bag 48 (Figure 1), the screws 25 are remounted on bars 27 and the screws 14 and 25 are actuated to apply pressure transversely and radially of the mold. The fluid pressure is supplied to bags 48 by suitable means (not shown) and the internal pressure is, of course, opposed by screws 14 and 25 which hold the mold parts in cooperative relation to the tire throughout the cure.

By provision of the sliding fluid connections with the chambered brackets associated in the manner shown with the jacketed base, considerable expensive piping, including flexible joints, is dispensed with and a neat, compact and efficient vulcanizing unit is the result.

It will appear from the foregoing that a simple, flexible duplex tire repairing unit has been provided by the invention which includes features also capable of effective use in other equipment of this type. Accordingly it will be understood that modifications of the invention or the utilization of the above features thereof in other equipment may be resorted to without departing from the spirit thereof or the scope of the appended claims.

What is claimed is:

1. A tire repair vulcanizer comprising a jacketed base member and jacketed wall members, one of said members being movable over said base member toward and from the other wall member, screw means for moving said movable wall member, a bracket through which said screw means is threaded, said bracket being chambered, said base having a duct connected to said chambered bracket, and a slidable connection between said movable wall member and said chambered bracket comprising a pipe connected to the movable wall member and slidable parallel to said screw in said chambered bracket for supplying a heating fluid from said base member to said movable wall member in all positions of adjustment of said member.

2. A tire repair vulcanizer comprising a jacketed base member and jacketed wall members, one of said members being movable over said base member toward and from the other wall member, means comprising a rod for moving said movable wall member, a bracket for supporting said rod, the latter being shiftable axially in said bracket, said bracket being chambered, said base having a duct connected to said chambered bracket, and a slidable connection extending parallel to said rod between said movable wall member and said chambered bracket, for supplying a heating fluid from said base member to said movable wall member in all positions of adjustment of said member.

WILLIAM J. CASSLEY.
JAMES W. BRUNDAGE.